US009760362B2

(12) United States Patent
Anderson et al.

(10) Patent No.: US 9,760,362 B2
(45) Date of Patent: Sep. 12, 2017

(54) ANALYTICS BASED PATCH MANAGEMENT AND DISTRIBUTION

(71) Applicant: International Business Machines Corporation, Armonk, NY (US)

(72) Inventors: Eric M. Anderson, Friendswood, TX (US); Christopher J. Dawson, Arlington, VA (US); Rajesh Radhakrishnan, Reston, VA (US); Guy I. T. Sidford, Worcestershire (GB)

(73) Assignee: International Business Machines Corporation, Armonk, NY (US)

( * ) Notice: Subject to any disclaimer, the term of this patent is extended or adjusted under 35 U.S.C. 154(b) by 358 days.

(21) Appl. No.: 14/037,612

(22) Filed: Sep. 26, 2013

(65) Prior Publication Data
US 2015/0089488 A1    Mar. 26, 2015

(51) Int. Cl.
*G06F 9/44* (2006.01)
*G06F 9/445* (2006.01)

(52) U.S. Cl.
CPC ..................... *G06F 8/65* (2013.01)

(58) Field of Classification Search
CPC ....................................................... G06F 8/65
USPC ........................................................ 717/172
See application file for complete search history.

(56) References Cited

U.S. PATENT DOCUMENTS

| | | | |
|---|---|---|---|
| 7,509,636 B2 | 3/2009 | McGuire et al. | |
| 8,484,652 B2 * | 7/2013 | Teshome et al. | 718/103 |
| 8,799,888 B1 * | 8/2014 | Fitzgerald et al. | 717/170 |
| 2004/0210653 A1 | 10/2004 | Kanoor et al. | |
| 2004/0243995 A1 * | 12/2004 | Sheehy | G06F 8/61 717/174 |
| 2007/0033635 A1 * | 2/2007 | Hirsave | G06F 21/577 726/1 |
| 2007/0169089 A1 * | 7/2007 | Bantz et al. | 717/168 |

(Continued)

FOREIGN PATENT DOCUMENTS

| | | |
|---|---|---|
| GB | 2410647 A | 8/2005 |
| JP | 2010128581 A * | 6/2010 |

OTHER PUBLICATIONS

IBM, "IBM acquires BigFix, Inc", retrieved on Aug. 29, 2013 from website: http://www-01.ibm.com/software/tivoli/welcome/bigfix/.

(Continued)

*Primary Examiner* — Lewis A Bullock, Jr.
*Assistant Examiner* — Theodore Hebert
(74) *Attorney, Agent, or Firm* — David B. Woycechowsky (57) ABSTRACT

In a method for determining a time to deploy and install patches one or more processors receive a request to deploy a patch by a target deployment time and install the patch by a target installation time, for at least one computing device of a plurality of computing devices on a network. The one or more processors determine a time frame to deploy the patch based on the target deployment time and availability of bandwidth on the network. The one or more processors determine a time to install the patch based on the target installation time and usage of the at least one computing device. The one or more processors cause the patch to be deployed within the determined time frame to deploy the patch. The one or more processors send an instruction to install the patch at the determined time to install the patch.

9 Claims, 3 Drawing Sheets

(56) References Cited

U.S. PATENT DOCUMENTS

| | | | |
|---|---|---|---|
| 2008/0154805 A1* | 6/2008 | Gurumoorthy | G06F 9/505 706/12 |
| 2008/0235678 A1 | 9/2008 | Bantz et al. | |
| 2009/0187899 A1* | 7/2009 | Mani et al. | 717/168 |
| 2012/0227036 A1* | 9/2012 | Crk et al. | 717/177 |
| 2015/0040117 A1* | 2/2015 | Fitzgerald, Ii et al. | 717/172 |
| 2015/0089488 A1* | 3/2015 | Anderson et al. | 717/172 |

OTHER PUBLICATIONS

Wikipedia, "BigFix", Wikipedia, the free encyclopedia, retrieved on Aug. 29, 2013 from website: http://en.wikipedia.org/wiki/BigFix.

Wikipedia, "Tivoli Software", Wikipedia, the free encyclopedia, retrieved on Aug. 26, 2013 from website: http://en.wikipedia.org/wiki/Tivoli_Software.

Wikipedia, "Tivoli Management Framework", Wikipedia, the free encyclopedia, retrieved on Aug. 26, 2013 from website: http://en.wikipedia.org/wiki/Tivoli_Management_Framework.

* cited by examiner

FIG. 1

FIG. 3

ANALYTICS BASED PATCH MANAGEMENT AND DISTRIBUTION

FIELD OF THE INVENTION

The present invention relates generally to software patch management, and more particularly to managing software patch deployment and installation.

BACKGROUND OF THE INVENTION

Most commercially available software products undergo a continuous revision process to repair or upgrade features and functions. Each revision of a software product or component may require the addition of new files and/or the replacement of existing files with files of newer versions. A patch is a piece of software designed to fix a problem with a computer program, update the computer program, or update the computer program's supporting data. This includes fixing security vulnerabilities and other bugs, and improving the usability or performance. Patches for proprietary software modify the program executable, which causes a computer to perform indicated tasks according to encoded instructions. The patch modifies the program executable by modifying a binary file of the program executable or by completely replacing the binary file of the program executable. Patches can also circulate in the form of source code modifications. In these cases, the patches consist of textual differences between two source code files. Patch management is the process of using a strategy and plan to determine which patches should be applied to a system at a specified time.

Enterprise systems are large-scale application software packages that support business processes, information flows, reporting, and data analytics in complex organizations. A patch management system, such as Big Fix®, is used to ensure standardized methods and procedures are used for efficient and prompt handling of all changes to control IT infrastructure in order to minimize the number and impact of any related incidents upon service. The patch management system includes a server that hosts a patch management program and one or more client computers on which a patch management client program is installed. The patch management program periodically sends patch requests to the patch management client programs. Patch requests include instructions to perform a management or reporting action. Patch requests can be programmed to target specific groups of devices to perform the actions.

Upon receipt of a patch request, the patch management client program determines if a task described by the patch request applies to the client computer it is managing. If the task applies, patch management client program sends an indication to the patch management program. The patch management program deploys the patch to the client computer.

SUMMARY

Aspects of embodiments of the present invention disclose a method, computer program product, and computer system for determining a time to deploy and install patches. One or more processors receive a request to deploy a patch by a target deployment time and install the patch by a target installation time, for at least one computing device of a plurality of computing devices on a network. The one or more processors determine a time frame to deploy the patch for the at least one computing device of the plurality of computing devices based on the target deployment time and availability of bandwidth on the network. The one or more processors determine a time to install the patch on the at least one computing device of the plurality of computing devices based on the target installation time and usage of the at least one computing device of the plurality of computing devices. The one or more processors cause the patch to be deployed to the at least one computing device of the plurality of computing devices within the determined time frame to deploy the patch. The one or more processors send an instruction to install the patch at the determined time to install the patch to the at least one computing device of the plurality of computing devices.

DETAILED DESCRIPTION

Patch scheduling and distribution generally utilizes static snapshots of network topology and bandwidth restrictions which are based on a view of the environment at a specific point in time. The nature of most companies is dynamic; the overall workload shifts daily as its employees progress toward completing tasks, complete tasks, and are assigned new tasks. The dynamic nature of this environment almost immediately renders patch schedules based on static snapshots of the environment obsolete. Aspects of the present invention determine when to deploy and install software patches, based on factors such as network bandwidth capacity, utilization and performance data, end point utilization and performance data, event data, change request, and change window data.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable-program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
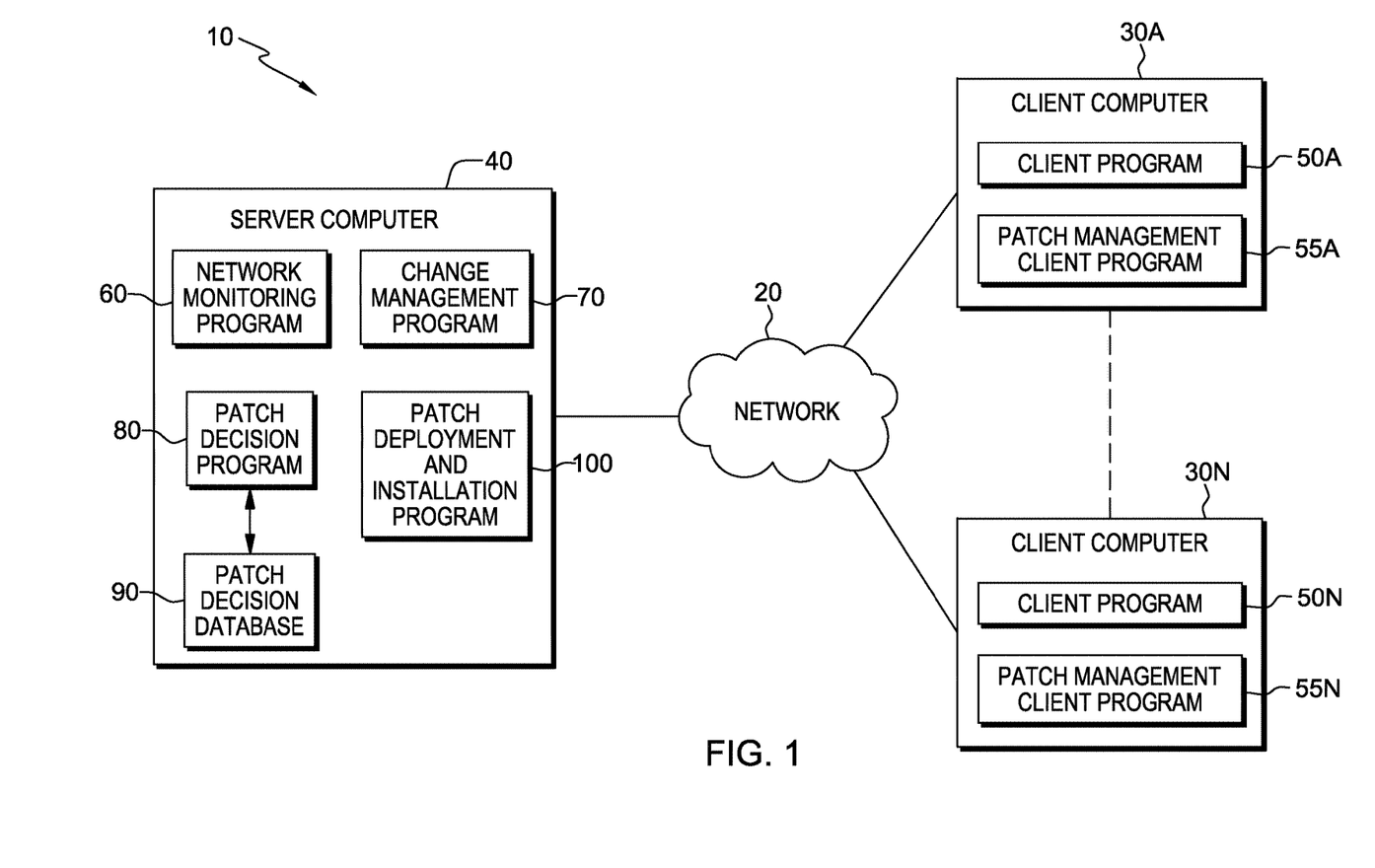
FIG. 1 is a functional block diagram illustrating a distributed data processing environment, in accordance with one embodiment of the present invention.

The present invention will now be described in detail with reference to the Figures. FIG. 1 depicts a diagram of distributed data processing environment 10 in accordance with one embodiment of the present invention. FIG. 1 provides only an illustration of one embodiment and does not imply any limitations with regard to the environments in which different embodiments may be implemented.

In the depicted embodiment, distributed data processing environment 10 includes two or more of client computers 30A through 30N (hereinafter "30A-N") and server computer 40 interconnected over network 20. Network 20 may be a local area network (LAN), a wide area network (WAN) such as the Internet, a combination of the two or any combination of connections and protocols that will support communications between client computers 30A-N and server computer 40, in accordance with embodiments of the invention. Network 20 may include wired, wireless, or fiber optic connections. Distributed data processing environment 10 may include additional server computers, client computers, or other devices not shown.

Client computers 30A-N may be desktop computers, laptop computers, tablet computers, personal digital assistants (PDAs), smart phones, or combinations thereof. In general, client computers 30A-N may be any electronic device or computing system capable of sending and receiving data, and communicating with server computer 40 over network 20. In the depicted embodiment, client computers 30A-N include client programs 50A through 50N (hereinafter 50A-N), respectively, and patch management client programs 55A through 55N (hereinafter 55A-N), respectively.

Server computer 40 may be a management server, web server, or any other electronic device or computing system capable of receiving and sending data, in accordance with embodiments of the invention. In other embodiments, server computer 40 may represent a server computing system utilizing multiple computers as a server system, such as in a cloud computing environment. In the depicted embodiment, server computer 40 includes network monitoring program 60, change management program 70, patch decision program 80, patch decision database 90, and patch deployment and installation program 100.

Client programs 50A-N operate on client computers 30A-N, respectively. In the depicted embodiment, client programs 50A-N are generic client programs that include sequences of instructions written to perform a specified task with client computers 30A-N. For example, client programs 50A-N are e-mail client programs. Client programs 50A-N may each include an executable form that client computers 30A-N can use directly to execute instructions. Patch management client programs 55A-N are installed on client computers 30A-N. Client computers 30A-N are managed under patch deployment and installation program 100, which resides on server computer 40. Patch management client programs 55A-N are each capable of executing an array of management services, such as real-time client status reporting, patch distribution, and security policy enforcement.

In the depicted embodiment, patch management client programs 55A-N each receive a patch request from patch deployment and installation program 100. Patch requests include instructions to perform a management or reporting action for client programs 50A-N. For example, a patch request may describe an update to client programs 50A-N to be installed. Patch requests include a target deployment time for the patch. The target deployment time is a data and time by which the patch must be deployed to client computers 30A-N. Patch requests also include a target installation time. The target installation time is a date and time by which the patch for client programs 50A-N must be installed on client computers 30A-N.

When each of patch management client programs 55A-N receive a patch request, patch management client programs 55A-N each determine if the patch should be installed on each of client computers 30A-N, respectively. For example, each of patch management client programs 55A-N determine if an update described by the patch request has already been installed on each of client programs 50A-N.

Network monitoring program 60 operates to monitor utilization and performance data of distributed data processing environment 10. In the depicted embodiment, network monitoring program 60 monitors utilization and performance data on network 20. For example, network monitoring program 60 monitors the input/output (I/O) throughput of client computers 30A-N by measuring the queue depth for each of client computers 30A-N and sending the queue depth for each of client computers 30A-N to patch decision program 80. Queue depth is the number of outstanding read and/or write requests waiting to access a hard drive. Performance-demanding applications can generate storage I/Os to create queue depths in the hundreds, whereas an average queue depth is generally well below 100. Queue depth is generally expressed by numeric values that represent the number of read and/or write requests waiting to access the hard drive. Hard disk queue depth can be measured by the time required for the hard drive to process a program without freezing or locking up.

In one embodiment, network monitoring program 60 monitors utilization and performance data of client programs 50A-N. For example, network monitoring program 60 determines the total blocks data rate of client programs 50A-N by measuring the read blocks data rate and written blocks data rate for client programs 50A-N. Read data blocks rate represents the number of data blocks read by client programs 50A-N per minute. Written data blocks rate represents the number of data blocks written to client programs 50A-N per minute. Network monitoring program 60 adds the read data blocks rate to the written data blocks rate to determine the total blocks rate and sends the total blocks rate to patch decision program 80. In another embodiment, network monitoring program 60 uses another method to measure the utilization and performance data of client programs 50A-N.

In one embodiment, network monitoring program 60 periodically sends utilization and performance updates for client computers 30A-N and client programs 55A-N to patch decision database 90 for storage. Change management program 70 sends a scheduling request to patch decision program 80 and to patch deployment and installation program 100. Change management program 70 requests a deployment time and an installation time from patch decision program 80 for the patch to each of client computers 30A-N and client programs 50A-N, respectively. In the depicted embodiment, change management program 70 receives a determined deployment time from patch decision program 80 for each of client computers 30A-N. In one embodiment, change management program 70 approves the determined deployment time for each of client computers 30A-N and sends the determined deployment time for each of client computers 30A-N to patch deployment and installation program 100. In another embodiment, change management program 70 does not approve the determined deployment time for each of client computers 30A-N. Change management program 70 requests a second determined deployment time for each of client computers 30A-N.

In the depicted embodiment, change management program 70 receives a determined installation time from patch decision program 80 for each of client programs 50A-N. In one embodiment, change management program 70 approves the determined installation time for each of client programs 50A-N and sends the determined installation time for each of client programs 50A-N to patch deployment and installation program 100. In another embodiment, change management program 70 does not approve the determined installation time for each of client programs 50A-N. Change management program 70 requests another determined installation time for each of client programs 50A-N.

Patch decision program 80 operates on server computer 40 to receive patch requests from change management program 70. Patch decision program 80 determines a time to deploy a patch to each of client computer 30A-N over network 20. Patch decision program 80 determines a time to install the patch on client programs 50A-N.

In the depicted embodiment, patch decision program 80 receives a patch request from change management program 70 for a patch to be installed for one or more client programs 50A-N. Each patch request includes a target deployment time and a target installation time for each patch for the one or more client programs 50A-N. The target deployment time is the time by which the patch must be deployed to the client computer corresponding to each of the one or more client programs 50A-N to be patched. For example, the target deployment time may be the same for each patch for the one or more client programs 50A-N. In another example, the target deployment time may be different for each patch for the one or more client programs 50A-N. The target installation time is the time by which the patch must be installed on the client computer corresponding to the one or more client programs 50A-N to be patched. For example, the target installation time may be the same for each patch for the one or more client programs 50A-N. In another example, the target installation time may be different for each patch for the one or more client programs 50A-N.

In the depicted embodiment, patch decision program 80 accesses patch decision database 90 to determine a deployment time for each patch for the one or more client programs 50A-N to be patched based on the target deployment time. In the depicted embodiment, the target deployment time is a specific time on a specific day. In another embodiment, the target deployment time may be a range of time, such as a two hour window on a specific day.

Patch decision database 90 is a repository that may be written and read by software on server computer 40 and is accessible to patch decision program 80. In one embodiment, patch decision database 90 is located on server computer 40. In another embodiment, patch decision database 90 may be located on another computing device within distributed data processing environment 10, provided that patch decision database 90 is accessible to patch decision program 80.

In the depicted embodiment, patch decision database 90 contains current and historical data about the date and time of previous patch requests, deployment of previous patches to client computers 30A-N, and installation of previous patches for client programs 50A-N, in distributed data processing environment 10. In this embodiment, patch decision database 90 contains historical data documenting usage of network 20, such as network traffic data, peak and off peak usage patterns, bandwidth, and I/O throughput data for distributed data processing environment 10. Patch decision database 90 may also contain network topology and routes for distributed data processing environment 10. Additionally, patch decision database 90 may contain current and historical data of system performance and utilization client computers 30A-N. Patch decision program 80 also contains historical data about the utilization of client programs 50A-N.

In the depicted embodiment, patch decision program 80, after receiving a patch request from change management program 70, accesses patch decision database 90 and determines the expected available bandwidth for network 20. Patch decision program 80 uses the historical data to determine the expected available bandwidth for all times between the time that the patch request is received and the target deployment time specified by the patch request. In the depicted embodiment, patch decision program 80 determines a deployment time for the patch to each client computer corresponding to the one or more client programs 50A-N to be patched based on network usage and available bandwidth to each of client computers 30A-N. In one embodiment, patch decision program 80 determines a deployment time for the patch to each client computer corresponding to the one or more client programs 50A-N to be patched when the most bandwidth is available and network usage is at a minimum. Patch decision program 80 sends the determined deployment time to change management program 70. Change management program 70 sends an instruction to patch deployment and installation program 100 to deploy each patch at the determined deployment time over network 20 to each client computer corresponding to the one or more client programs 50A-N to be patched. Patch deployment and installation program 100 deploys each patch at the determined deployment time over network 20 to each client computer corresponding to the one or more client programs 50A-N to be patched. Each patch to be deployed to a client computer corresponding to the one or more client programs 50A-N to be patched may have a different determined deployment time.

In another embodiment, patch decision program 80 determines more than one deployment time for each patch to each client computer corresponding to the one or more client programs 50A-N to be patched. For example, patch decision program 80 determines a first deployment time at which the most bandwidth is available. Patch decision program 80 then determines a second deployment time at which less bandwidth is available than the first deployment time. More bandwidth is available at the second deployment time than any other time, besides the first deployment time, between the time the patch request was received by patch decision program 80 and the target deployment time.

In the depicted embodiment, patch decision program 80 also determines an installation time for each patch. Patch decision program 80 accesses patch decision database 90 to determine performance and usage patterns for each client computer corresponding to the one or more client programs 50A-N to be patched. Patch decision program 80 determines an installation time, between the determined deployment time and the target installation time, at which time each client computer corresponding to the one or more client programs 50A-N to be patched historically experiences minimal usage. In the depicted embodiment, patch decision program 80 sends the installation time to change management program 70. Change management program 70 sends the installation time to patch deployment and installation program 100. Patch deployment and installation program 100 sends an installation instruction to each client computer corresponding to the one or more client programs 50A-N to be patched at the installation time. The installation instruction instructs each client computer corresponding to the one or more client programs 50A-N to be patched to install the deployed patch.

Patch deployment and installation program 100 operates on server computer 40 to receive a patch request from change management program 70. Patch deployment and installation program 100 sends the patch request to patch management client programs 55A-N. In another embodiment, patch deployment and installation program 100 receives an indication from at least one of patch management client programs 55A-N not to deploy the patch to client computers 30A-N, respectively. Patch deployment and installation program 100 sends an indication to change management program 70 that the patch is not to be deployed to the at least one of client computers 30A-N.

In one embodiment, patch deployment and installation program 100 receives an instruction from change management program 70 to deploy a patch to each of client computers 30A-N at a deployment time for each of client computers 30A-N. Patch deployment and installation program 100 deploys the patch to each of client computers 30A-N at the deployment time for each of client computers 30A-N.

In one embodiment, patch deployment and installation program 100 receives an instruction from change management program 70 to install a patch to each of client programs 50A-N at an installation time for each of client programs 50A-N. Patch deployment and installation program 100 installs the patch to each of client programs 50A-N at the installation time for each of client programs 50A-N.

Figure 2:
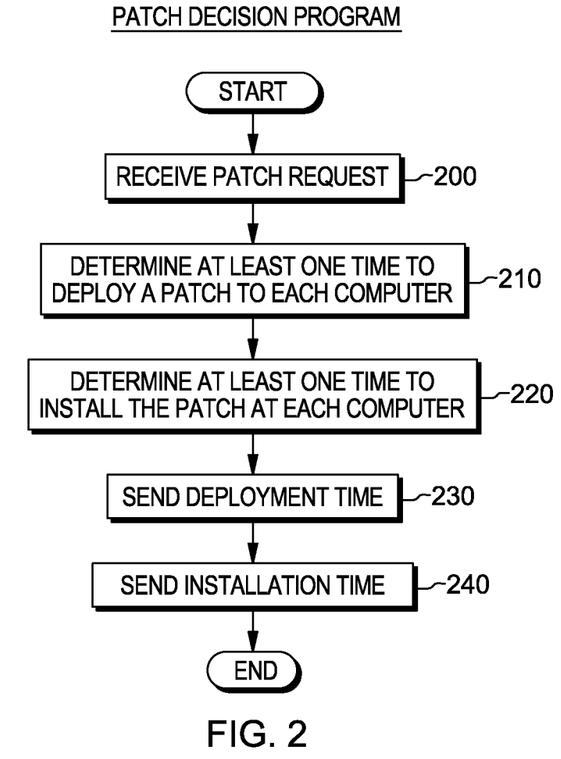
FIG. 2 is a flowchart depicting operational steps of patch decision program, executing within the distributed data processing environment of FIG. 1, for determining a time to deploy a patch to a client computer and a time to install the patch for a client program on the client computer, in accordance with one embodiment of the present invention.

FIG. 2 is a flowchart of the steps of patch decision program 80 for determining a time to deploy a patch to a client computer and a time to install the patch for a client program on the client computer, in accordance with one embodiment of the present invention. In the depicted embodiment, patch decision program 80 determines a time to deploy a patch to client computer 30A-N over network 20 and to determine a time to install the patch for client programs 50A-N on client computers 30A-N, respectively.

In one embodiment, initially, change management program 70 sends a patch request to patch deployment and installation program 100. Patch deployment and installation program 100 sends the patch request to each of patch management client programs 55A-N over network 20. Patch management client programs 55A-N determine if the patch should be installed for client programs 50A-N, respectively. In one embodiment, the patch request describes an update to be installed for client programs 50A-N. Patch management client programs 55A-N access client programs 50A-N to determine if the update is necessary. For example, patch management client programs 55A-N determine if the update has already been installed for client programs 50A-N. In the depicted embodiment, patch management client programs 55A-N determine that the update has not been installed for client programs 50A-N. Patch management client programs 55A-N each send an indication to patch deployment and installation program 100 that the patch is to be installed on each of client programs 50A-N. Patch deployment and installation program 100 sends an indication that the patch is to be deployed to client computers 30A-N and installed on client programs 50A-N, respectively. Change management program 70 sends the patch request to patch decision program 80.

In step 200, patch decision program 80 receives a patch request from change management program 70. In the depicted embodiment, the patch request specifies a target date and time for deployment of the patch to each of client computers 30A-N and a target date and time for installation of the patch for each of client programs 50A-N. For example, the patch request specifies that the patch must be deployed to each of client computers 30A-N by Saturday, September 15 at 17:00, which is the target deployment time, and the patch must be installed for each of client programs 50A-N by Sunday, September 16 at 17:00, which is the target installation time.

In step 210, patch decision program 80 determines at least one time to deploy the patch over network 20 to each client computer 30A-N. In the depicted embodiment, patch decision program 80 accesses patch decision database 90 to determine the expected available bandwidth for network 20 at all times between the time that the patch request was received by patch decision program 80 and the target deployment time specified by the patch request. For example, if patch decision program 80 received the patch request on Sunday, September 9 at 03:00, patch decision program 80 accesses the historical data stored by patch decision database 90 to determine network usage patterns and expected available bandwidth between September 9 at 03:00 and September 15 at 17:00.

Patch decision program 80 determines a deployment date and time at which the most bandwidth is available, the usage of network 20 is minimal, and the utilization of each of client computers 30A-N is minimal. Alternatively, patch decision program 80 may determine more than one time to deploy each patch. For example, patch decision program 80 determines two times with the greatest available bandwidth between the time that the patch request is received and the time that the patch must be installed. If, for example, the deployment at the first determined deployment time is unsuccessful due to technical difficulties (i.e. a client computer is experiencing unscheduled maintenance), patch decision program 80 uses a second determined deployment time.

In the depicted embodiment, patch decision program 80 sends the deployment time to change management program 70. Change management program 70 approves the deployment time sent by patch decision program 80 and sends an indication to patch decision program 80 that the determined deployment time is approved. In another embodiment, change management program 70 does not approve the deployment time. Change management program 70 requests a second deployment time from patch decision program 80.

In step 220, patch decision program 80 determines at least one time to install each patch for client programs 50A-N. In one embodiment, based on the target deployment time determined in step 210, patch decision program 80 assesses historical data of systems performance and utilization for each of client programs 50A-N between the determined deployment time and the target installation time. If, for example, patch decision program 80 determines in step 210 that the patch will be deployed to client program 50A on be Wednesday, September 12 at 03:30, patch decision program 80 accesses patch decision database 90 and assesses historical data of system performance and utilization of client computer 30A between Wednesday, September 12 at 03:30 and Sunday, September 16 at 17:00, which is the target installation time. In one embodiment, patch decision program 80 also includes the amount of time that the installation is estimated to take when determining an installation time. For example, if the installation of a patch is expected to take two hours on client computer 30A, patch decision program 80 will assess historical data of system performance and utilization of client computer 30A between Wednesday, September 12 at 3:30 and Sunday, September 16 at 15:00, which is two hours before the installation time specified by the patch request.

In the depicted embodiment, patch decision program 80 sends the installation time to change management program 70. Change management program 70 approves the installation time sent by patch decision program 80 and sends an indication to patch decision program 80 that the determined installation time is approved. In another embodiment, change management program 70 does not approve the installation time. Change management program 70 requests a second installation time from patch decision program 80.

In step 230, patch decision program 80 sends the determined deployment time to change management program 70. Change management program 70 sends deployment instructions to patch deployment and installation program 100. In the depicted embodiment, deployment instructions include an instruction to deploy a patch to each of client computers 30A-N over network 20 at the determined deployment time for each of client computers 30A-N. Patch deployment and installation program 100 deploys a patch to each of client computers 30A-N over network at the determined deployment time for each of client computers 30A-N. In one embodiment, patch decision program 80 may have, in step 210, determined more than one deployment time to each of client computers 30A-N. In this embodiment, patch installation and deployment program 100 deploys each patch at the first deployment time. If patch deployment and installation program 100 is unable to deploy the patch to at least one of client computers 30A-N at the first determined deployment time for the at least one of client computers 30A-N, change management program 70 sends an instruction to patch installation and deployment program 100 to deploy the patch at a second determined deployment time for the at least one of client computers 30A-N. Patch installation and deployment program 100 deploys the patch at the second determined deployment time for the at least one of client computers 30A-N. If, for example, an unexpected problem with the network decreases the available bandwidth so that the available bandwidth is lower at the first deployment time than the projected available bandwidth at the second deployment time, patch installation and deployment program 100 deploys the patch at the second determined deployment time.

In step 240, patch decision program 80 sends the determined installation time for each of client programs 50A-N to change management program 70. Change management program 70 sends installation instructions to patch deployment and installation program 100. In the depicted embodiment, installation instructions include instructions to install the patch at the determined installation time for each of client programs 50A-N. In the depicted embodiment, patch deployment and installation program 100 sends instructions to each of client programs 50A-N to install the patch at the installation time for each of client programs 50A-N.

Figure 3:
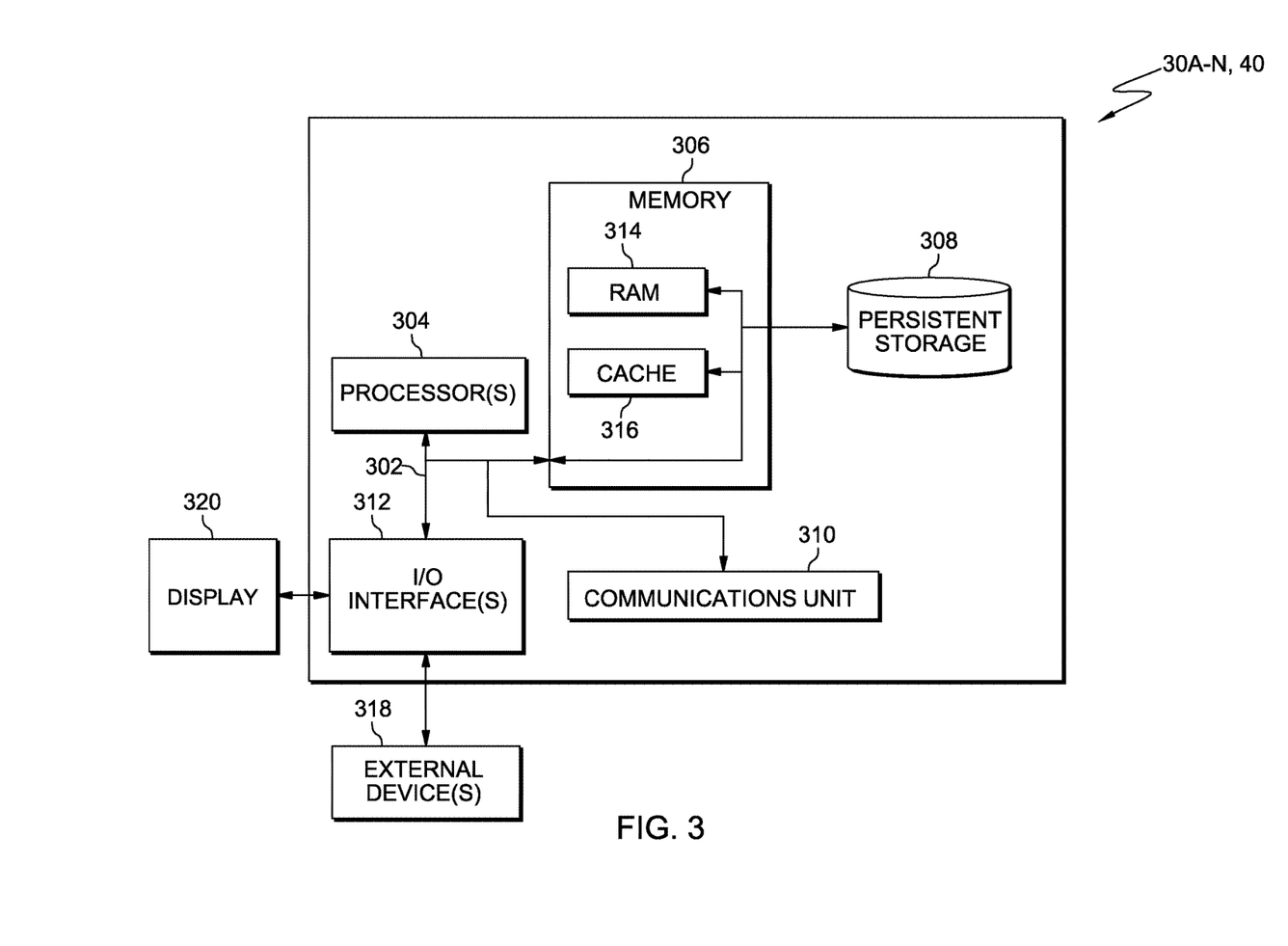
FIG. 3 depicts a block diagram of components of the server computer and client computers of FIG. 1, in accordance with one embodiment of the present invention.

FIG. 3 depicts a block diagram of components of client computers 30A-N and server computer 40, in accordance with one embodiment of the present invention. It should be appreciated that FIG. 3 provides only an illustration of one implementation and does not imply any limitations with regard to the environments in which different embodiments may be implemented. Many modifications to the depicted environment may be made.

Client computers 30A-N and server computer 40 each include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage media.

Client programs 50A-N and patch management client programs 55A-N are stored in persistent storage 308 of client computers 30A-N, respectively, for execution by one or more of the respective computer processors of 304 client computers 30A-N via one or more the respective memories of memory 306 of client computers 30A-N. Network monitoring program 60, change management program 70, patch decision program 80, patch decision database 90, and patch deployment and installation program 100 are stored in persistent storage 308 of server computer 40 for execution by one or more of the respective computer processors 304 of server computer 40 via one or more memories of memory 306 of server computer 40. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other servers or devices. In these examples, communications unit 310 includes one or more network interface cards. Communications unit 310 may provide communications through the use of either or both physical and wireless communications links. Client programs 50A-N and patch management client programs 55A-N may be downloaded to persistent storage 308 of client computers 30A-N, respectively, through the respective communications unit 310 of client computers 30A-N. Network monitoring program 60, change management program 70, patch decision program 80, patch decision database 90, and patch deployment and installation program 100 may be downloaded to persistent storage 308 of server computer 40, respectively, through the respective communications unit 310 of server computer 40.

I/O interface(s) 312 allows for input and output of data with other devices that may be connected to client computers 30A-N and server computer 40. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., client programs 50A-N and patch management client programs 55A-N can be stored on such portable computer-readable storage media and can be loaded onto persistent storage 308 of client computers 30A-N, respectively, via the respective I/O interface(s) 312 of client computers 30A-N. Software and data used to practice embodiments of the present invention, e.g., network monitoring program 60, change management program 70, patch decision program 80, patch decision database 90, and patch deployment and installation program 100, can be stored on such portable computer-readable storage media and can be loaded onto persistent storage 308 of server computer 40, respectively, via the respective I/O interface(s) 312 of server computer 40. I/O interface(s) 312 also connect to a display 320.

Display 320 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for use with a patch server computer and a first patch target computer which are in data communication with each other through a data communication network, the method comprising:
receiving, by the patch server computer, a first patch request that includes information indicative of an identity of the first patch target computer, a first deadline for completion of installation of the first patch on the second patch target computer;
responsive to receipt of the first patch request, accessing, by the patch server computer, a patch decision database to acquire a first bandwidth data set that includes information indicative of expected available bandwidth of the data communication network at all times between: (i) a time of the receipt of the first patch request, and (ii) the first deadline;

determining, by the patch server computer, a first target deployment time based, at least in part, on the first bandwidth data set;

determining, by the patch server computer, a first installation interval based on at least the following factors: (i) historical data of systems performance for the first patch target computer, and (ii) historical data of utilization of the first patch target computer, with the first installation interval being an expected amount of time it will take to install the first patch on the first target computer after the first patch has been deployed to the first target computer;

determining a first installation time based on the first deadline and the first installation interval, with the first installation time being a time and date for starting to install the first patch on the first target computer, and with the first installation time falling at a date and time between the first target deployment time and the first deadline;

deploying, by the patch server computer, the first patch from the patch server computer, over the communication network, and to the first patch target computer at the first target deployment time;

sending, by the patch server computer, over the communication network and to the first patch target computer, the first installation time so that the first patch target computer will install the first patch at the first installation time; and installing, by the first target computer, the first patch starting at the first installation time.

2. The method of claim 1 wherein the first patch request further includes information indicative of an identity of a second patch target computer, a second deadline for completion of installation of the first patch on the second patch target computer;

responsive to receipt of the first patch request, accessing, by the patch server computer, a patch decision database to acquire a second bandwidth data set that includes information indicative of expected available bandwidth of the data communication network at all times between: (i) a time of the receipt of the first patch request, and (ii) the second deadline;

determining, by the patch server computer, a second target deployment time based, at least in part, on the second bandwidth data set;

determining, by the patch server computer, a second installation time based on at least the following factors: (i) historical data of systems performance for the second patch target computer, and (ii) historical data of utilization of the second patch target computer, with the second installation time being a time and date for starting to install the first patch on the second target computer, and with the second installation time falling at a date and time between the second target deployment time and the second deadline;

deploying, by the patch server computer, the first patch from the patch server computer, over the communication network, and to the second patch target computer at the second target deployment time; and sending, by the patch server computer, over the communication network and to the second patch target computer, the second installation time so that the second patch target computer will install the first patch at the second installation time.

3. The method of claim 2 further comprising:

installing, by the second target computer, the first patch starting at the second installation time.

4. A computer program product comprising:

a non-transitory machine readable storage device; and computer code stored on the machine readable storage device, with the computer code including instructions for causing a processor(s) set to perform operations including the following:

receiving, by the patch server computer, a first patch request that includes information indicative of an identity of the first patch target computer, a first deadline for completion of installation of the first patch on the second patch target computer, responsive to receipt of the first patch request, accessing, by the patch server computer, a patch decision database to acquire a first bandwidth data set that includes information indicative of expected available bandwidth of the data communication network at all times between: (i) a time of the receipt of the first patch request, and (ii) the first deadline, determining, by the patch server computer, a first target deployment time based, at least in part, on the first bandwidth data set, determining, by the patch server computer, a first installation interval based on at least the following factors: (i) historical data of systems performance for the first patch target computer, and (ii) historical data of utilization of the first patch target computer, with the first installation interval being an expected amount of time it will take to install the first patch on the first target computer after the first patch has been deployed to the first target computer, determining a first installation time based on the first deadline and the first installation interval, with the first installation time being a time and date for starting to install the first patch on the first target computer, and with the first installation time falling at a date and time between the first target deployment time and the first deadline, deploying, by the patch server computer, the first patch from the patch server computer, over the communication network, and to the first patch target computer at the first target deployment time, sending, by the patch server computer, over the communication network and to the first patch target computer, the first installation time so that the first patch target computer will install the first patch at the first installation time, and installing, by the first target computer, the first patch starting at the first installation time.

5. The computer program product of claim 4 wherein the first patch request further includes information indicative of an identity of a second patch target computer, a second deadline for completion of installation of the first patch on the second patch target computer;

responsive to receipt of the first patch request, accessing, by the patch server computer, a patch decision database to acquire a second bandwidth data set that includes information indicative of expected available bandwidth of the data communication network at all times between: (i) a time of the receipt of the first patch request, and (ii) the second deadline;

determining, by the patch server computer, a second target deployment time based, at least in part, on the second bandwidth data set;

determining, by the patch server computer, a second installation time based on at least the following factors: (i) historical data of systems performance for the second patch target computer, and (ii) historical data of utilization of the second patch target computer, with the second installation time being a time and date for starting to install the first patch on the second target computer, and with the second installation time falling at a date and time between the second target deployment time and the second deadline;

deploying, by the patch server computer, the first patch from the patch server computer, over the communication network, and to the second patch target computer at the second target deployment time; and sending, by the patch server computer, over the communication network and to the second patch target computer, the second installation time so that the second patch target computer will install the first patch at the second installation time.

6. The computer program product of claim 5 wherein the computer code further includes instructions for causing the processor(s) set to perform the following operations:

installing, by the second target computer, the first patch starting at the second installation time.

7. A computer system comprising:

a processor(s) set;

a machine readable storage device; and computer code stored on the machine readable storage device, with the computer code including instructions for causing the processor(s) set to perform operations including the following:

receiving, by the patch server computer, a first patch request that includes information indicative of an identity of the first patch target computer, a first deadline for completion of installation of the first patch on the second patch target computer, responsive to receipt of the first patch request, accessing, by the patch server computer, a patch decision database to acquire a first bandwidth data set that includes information indicative of expected available bandwidth of the data communication network at all times between: (i) a time of the receipt of the first patch request, and (ii) the first deadline, determining, by the patch server computer, a first target deployment time based, at least in part, on the first bandwidth data set, determining, by the patch server computer, a first installation interval based on at least the following factors: (i) historical data of systems performance for the first patch target computer, and (ii) historical data of utilization of the first patch target computer, with the first installation interval being an expected amount of time it will take to install the first patch on the first target computer after the first patch has been deployed to the first target computer, determining a first installation time based on the first deadline and the first installation interval, with the first installation time being a time and date for starting to install the first patch on the first target computer, and with the first installation time falling at a date and time between the first target deployment time and the first deadline, deploying, by the patch server computer, the first patch from the patch server computer, over the communication network, and to the first patch target computer at the first target deployment time, sending, by the patch server computer, over the communication network and to the first patch target computer, the first installation time so that the first patch target computer will install the first patch at the first installation time, and installing, by the first target computer, the first patch starting at the first installation time.

8. The computer system of claim 7 wherein the first patch request further includes information indicative of an identity of a second patch target computer, a second deadline for completion of installation of the first patch on the second patch target computer;

responsive to receipt of the first patch request, accessing, by the patch server computer, a patch decision database to acquire a second bandwidth data set that includes information indicative of expected available bandwidth of the data communication network at all times between: (i) a time of the receipt of the first patch request, and (ii) the second deadline;

determining, by the patch server computer, a second target deployment time based, at least in part, on the second bandwidth data set;

determining, by the patch server computer, a second installation time based on at least the following factors: (i) historical data of systems performance for the second patch target computer, and (ii) historical data of utilization of the second patch target computer, with the second installation time being a time and date for starting to install the first patch on the second target computer, and with the second installation time falling at a date and time between the second target deployment time and the second deadline;

deploying, by the patch server computer, the first patch from the patch server computer, over the communication network, and to the second patch target computer at the second target deployment time; and sending, by the patch server computer, over the communication network and to the second patch target computer, the second installation time so that the second patch target computer will install the first patch at the second installation time.

9. The computer system of claim 8 wherein the computer code further includes instructions for causing the processor(s) set to perform the following operations:

installing, by the second target computer, the first patch starting at the second installation time.

* * * * *